No. 677,887. Patented July 9, 1901.
O. SCHAERER.
APPARATUS FOR THE MANUFACTURE OF CUTTERS.
(Application filed July 17, 1900.)
(No Model.)
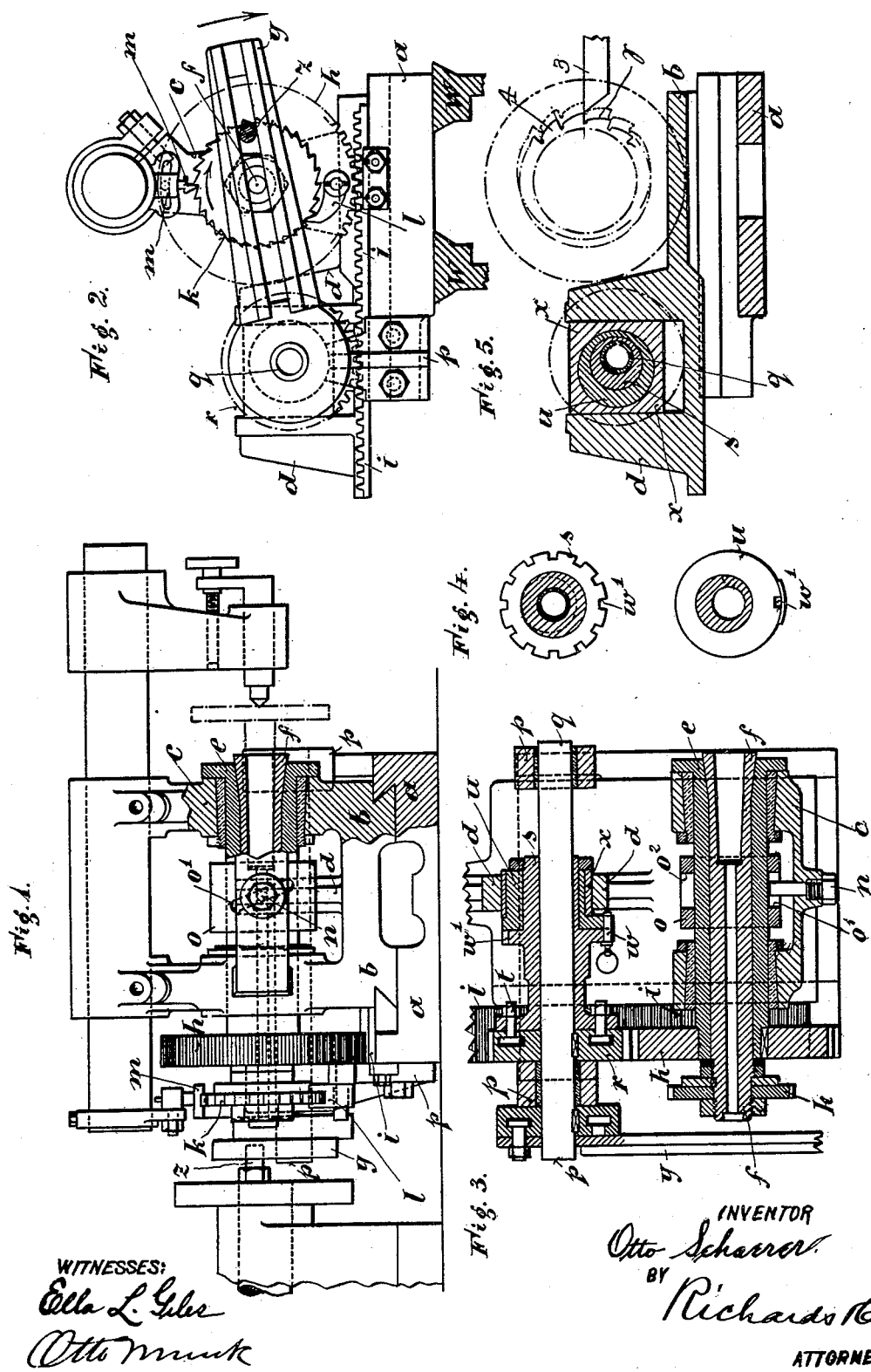
WITNESSES:
Ella L. Giles
Otto Munk
INVENTOR
Otto Scharrer
BY
Richards Co
ATTORNEYS.

UNITED STATES PATENT OFFICE.

OTTO SCHAERER, OF ZURICH, SWITZERLAND.

APPARATUS FOR THE MANUFACTURE OF CUTTERS.

SPECIFICATION forming part of Letters Patent No. 677,887, dated July 9, 1901.

Application filed July 17, 1900. Serial No. 23,877. (No model.)

*To all whom it may concern:*

Be it known that I, OTTO SCHAERER, a citizen of the Republic of Switzerland, and a resident of Zurich, Switzerland, have invented certain new and useful Improvements in Apparatus for the Manufacture of Cutters, of which the following is a specification.

This invention relates to a machine for backing off the teeth of cutters and the like—that is, cutting the periphery of the teeth, which extend from the top of the radial wall of one tooth to substantially the bottom of the radial wall of the succeeding tooth.

The object of the invention is to provide means for feeding the cutter-blank toward the cutting-tool during the rotation of the former, the rotation taking place step by step.

To this end the invention includes a table with means for reciprocating the same, and a mandrel carrying the blank supported by the table and moving with the same, means being provided to rotate the mandrel during the forward movement of the table and arresting the mandrel during the rearward reciprocatory movement.

The accompanying drawings represent the subject of the invention in illustration as an example.

Figure 1 is a side view, in partial longitudinal section, of the apparatus. Fig. 2 is an end view. Fig. 3 is a horizontal sectional view. Fig. 4 is a detail, and Fig. 5 shows a diagrammatic representation of the working operation.

The sliding carriage guide-plate $a$, which is shown to be set on the supports W W of a lathe, serves to guide the carriage $b$. The latter carries the bearings $c$ and the guide-standards $d\ d$, Fig. 2.

A shaft $e$, Fig. 1, is journaled in the bearings $c$, and through this shaft a hollow spindle $f$ extends, which serves to receive the mandrel. On the shaft $e$ is keyed a toothed wheel $h$, which gears with a rack $i$, fixed to the bed $b$. The ratchet-wheel $k$, fixed on the spindle $f$, is rotated forwardly by a pawl $l$, carried by the toothed wheel $h$. A pawl $m$ prevents the ratchet-wheel from turning back. Through a bracket connecting the bearings $c$ a pin $n$ extends, which may be engaged with either of the oppositely-placed obliquely-arranged slots $o'\ o^3$ in a collar $o$, secured to the shaft $e$. In the bearings $p\ p$ on the carriage guide-plate $a\ a$ shaft $q$ is journaled, on which a toothed wheel $r$ is keyed, Figs. 2 and 3. An eccentric $s$ is arranged rotatably on the shaft $q$ and is connected to the toothed wheel $r$ by screws $t\ t$, which engage in a circular slot therein. The eccentric $s$ is surrounded by an eccentric ring $u$, which can be secured to the eccentric $s$, so as to have no movement independent thereof. The block $x$, guided between the standards $d\ d$, carries the eccentric ring $u$. As the shaft $q$ rotates by reason of the eccentrics $s\ u$ the sliding carriage $b$ is reciprocated toward and from the knife 3. (Shown in Fig. 5.) A connecting-link $y$, which is fixed adjustably on the shaft $q$, is oscillated by a driver-pin $z$ with the rotation of the lathe spindle or mandrel. The eccentric $u$ can be turned about the eccentric $s$, and as the latter can likewise be turned about shaft $q$ it will be clear that the throw of said eccentric can be greatly varied, and thereby the reciprocatory movement of the carriage toward and from the knife regulated.

The operation of the apparatus and the turning of a cutter or shaper is as follows: The rotation of the lathe-spindle driven in the usual manner causes, through the pin $z$ and link $y$, an oscillatory movement of the shaft $q$, and thereby, as before described, the reciprocatory movement of the table $b$. This oscillating movement is also transmitted by the toothed wheel $r$ and the rack $i$, engaging with the same, to the toothed wheel $h$, and by means of the pawl $l$ a step-by-step movement is given to the ratchet $k$, and thereby to the spindle $f$, on which the ratchet is fixed. By this means the work carried by spindle $f$ is given a step-by-step rotation, which movement takes place during the forward movement of the carriage or as it approaches the knife 3. This, as shown in Fig. 5, cuts the retreating wall or peripheries 4 of the teeth. In the other direction of the rotary movement of the shaft $e$ and the toothed wheel $h$ the spindle $f$ is arrested by the pawl $m$ catching in the ratchet-wheel $k$. Owing to adjustments of the eccentrics $u$ and $s$ the depth of the teeth cut may be regulated by varying the movement of the table $b$, which varies the advance of the work against the tool. When screw $n$ is adjusted so that its end is freed from collar o, the shaft e will rotate without feeding longitudinally, so that the teeth cut by knife 3 are not beveled; but when the point of the screw n is guided in one of the slots o' or o², as the screw is held in a fixed position and the collar o rotates with the shaft e, a displacement of the shaft e and the spindle f takes place during the rotation of the same, which displacement will be to the right or left during the working operation, according to whether the slot o' or o² is engaged, so that the teeth cut will have their faces beveled to one side or the other, according to which of the slots o' o² is in engagement with the pin.

In making cutters of smaller diameter or cutters with a less number of teeth it is necessary that the depth of the individual clearances shall vary, so as to leave the necessary strength for the teeth. To this end the movement of the carriage must be regulated to give the proper movement relatively to the cutter-tool. This is obtained by adjusting the eccentric ring or collar u on the eccentric s to reduce the eccentricity to the desired slight measure. A pin w, inserted into notches w' in the eccentrics, Figs. 3 and 4, serves to secure the eccentrics in the desired position.

Having now described my invention, what I claim as new, and desire to secure by Letters Patent, is—

1. In combination a supporting-plate, a sliding table, a spindle carrying the work carried by said table, a fixed cutter, an oscillating arm with means for operating the same, a shaft oscillated by said arm, means for reciprocating the table toward and from the cutter operated by said shaft, and means for rotating the work-spindle step by step, said rotary movement taking place simultaneously with the approach of the table to the cutter.

2. In combination a guide-plate, a table slidably mounted thereon, bearings carried by the table, a shaft journaled in the same, a gear carried by said shaft, a sliding rack meshing therewith, bearings carried by the guide-plate, a second shaft journaled therein, an adjustable connection between the same and the table for reciprocating the latter as the second shaft oscillates, means for oscillating the same, a gear carried thereby meshing with said rack whereby the movement of said gear is communicated to the gear on the first-mentioned shaft, a cutter, a work-spindle journaled in the first-mentioned shaft and means interposed between said shaft and spindle for feeding the latter step by step as said shaft oscillates in one direction said rotation of the spindle taking place simultaneously with the movement of the table toward the work.

3. In combination a guide-plate, a table slidably mounted thereon, bearings carried thereby, a shaft journaled therein, a second shaft with means for oscillating the same journaled in bearings carried by the guide-plate, means interposed between the shaft and table for reciprocating the latter, means for oscillating the first shaft interposed between the same and the second shaft, a work-carrying spindle journaled in the first shaft, a fixed cutter, means interposed between the first shaft and spindle for feeding the latter step by step, the advance of the table toward the cutter taking place simultaneously with the feeding movement of the spindle, and means for shifting the first shaft axially during the feeding movement of the spindle.

4. In combination a guide-plate, a table slidably mounted thereon, bearings carried thereby, a shaft journaled therein, a second shaft with means for oscillating the same journaled in bearings carried by the guide-plate, means interposed between the shaft and table for reciprocating the latter, means for oscillating the first shaft interposed between the same and the second shaft, a work-carrying spindle journaled in the first shaft, a fixed cutter, means interposed between the first shaft and spindle for feeding the latter step by step, the advance of the table toward the knife taking place simultaneously with the feeding movement of the spindle and means adapted to be thrown out of operation for shifting the first shaft axially during the feeding movement of the spindle either to the right or left.

In witness whereof I have hereunto set my hand in presence of two witnesses.

OTTO SCHAERER.

Witnesses:
T. B. BICKEL,
FRIEDRICH ALBERT GEIGER.